United States Patent [19]

Brown et al.

[11] Patent Number: 5,102,836

[45] Date of Patent: Apr. 7, 1992

[54] CERAMIC MATERIALS WITH LOW THERMAL CONDUCTIVITY AND LOW COEFFICIENTS OF THERMAL EXPANSION

[75] Inventors: Jesse Brown, Christiansburg; Deidre Hirschfeld, Elliston; Dean-Mo Liu, Blacksburg; Yaping Yang, Blacksburg; Tingkai Li, Blacksburg; Robert E. Swanson, Blacksburg; Steven Van Aken, Blacksburg, all of Va.; Jin-Min Kim, Seoul, Rep. of Korea

[73] Assignees: Center for Innovative Technology, Herndon; Virginia Tech Intellectual Properties, Inc.; Virginia Polytechnic and State University, both of Blacksburg, all of Va.

[21] Appl. No.: 533,143

[22] Filed: Jun. 6, 1990

[51] Int. Cl.[5] ............................................. C04B 35/48
[52] U.S. Cl. .................................. 501/104; 501/102; 501/111; 264/66
[58] Field of Search ..................... 501/102, 104, 111; 264/66

[56] References Cited

U.S. PATENT DOCUMENTS

| | | | |
|---|---|---|---|
| 4,247,249 | 1/1981 | Siemers | 415/174 |
| 4,751,206 | 6/1988 | Yamai et al. | 501/102 |
| 4,801,566 | 1/1989 | Limaye et al. | 501/104 |
| 4,883,781 | 11/1989 | Watanabe et al. | 501/102 |
| 4,888,312 | 12/1989 | Watanabe et al. | 501/102 |
| 4,925,816 | 5/1990 | Watanabe et al. | 501/104 |

OTHER PUBLICATIONS

Limaye, S. Y., et al., "Synthesis and Thermal Expansion of $MZr_4P_6O_{24}$ (M=Mg, Ca, Sr, Ba)", *J. A. Ceram. Soc.*, 70 [10] C-232-C-236, (1987).
Kazokos-Kijowski et al., "Synthesis, Crystal Data and Thermal Stability of Magnesium Zirconium Phosphate $[MgZr_4P_6O_{24}]$", *Mat. Res. Bull.*, vol. 23, pp. 1177-1184, (1988).
Komarneni et al., "Hydrothermal Preparation of the Low-Expansion NZP Family of Materials", *Int. J. High Technology Ceramics*, 4, pp. 31-39, (1988).
Agrawal et al., "Synthesis and Sinterning of $Ca_{0.5}Zr_2P_3O_{12}$ A Low Thermal Expansion Material", *Mat. Res. Bull.*, vol. 20, No. 2, pp. 99-106, (1985).
Lange et al., "Open-Cell, Low-Density Ceramics Fabricated from Reticulated Polymer Substrates", *Advanced Ceramic Materials*, vol. 2, No. 4, pp. 827-831, (1987).

*Primary Examiner*—William R. Dixon, Jr.
*Assistant Examiner*—Alan Wright
*Attorney, Agent, or Firm*—Mason, Fenwick & Lawrence

[57] ABSTRACT

Compositions having the general formula $(Ca_xMg_{1-x})Zr_4(PO_4)_6$ where x is between 0.5 and 0.99 are produced by solid state and sol-gel processes. In a preferred embodiment, when x is between 0.5 and 0.8, the MgCZP materials have near-zero coefficients of thermal expansion. The MgCZPs of the present invention also show unusually low thermal conductivities, and are stable at high temperatures. Macrostructures formed from MgCZP are useful in a wide variety of high-temperature applications. In a preferred process, calcium, magnesium, and zirconium nitrate solutions have their pH adjusted to between 7 and 9 either before or after the addition of ammonium dihydrogen phosphate. After dehydration to a gel, and calcination at temperatures in excess of 850° C. for approximately 16 hours, single phase crystalline MgCZP powders with particle sizes ranging from approximately 20 nm to 50 nm result. The MgCZP powders are then sintered at temperatures ranging from 1200° C. to 1350° C. to form solid macrostructures with near-zero bulk coefficients of thermal expansion and low thermal conductivities. Porous macrostructures of the MgCZP powders of the present invention are also formed by combination with a polymeric powder and a binding agent, and sintering at high temperatures. The porosity of the resulting macrostructures can be adjusted by varying the particle size of the polymeric powder used.

22 Claims, 5 Drawing Sheets

THERMAL CONDUCTIVITY MEASUREMENTS OF Mg/Ca COMPOUNDS

THERMAL CONDUCTIVITY MEASUREMENTS OF Mg/Ca COMPOUNDS

FIG. 3
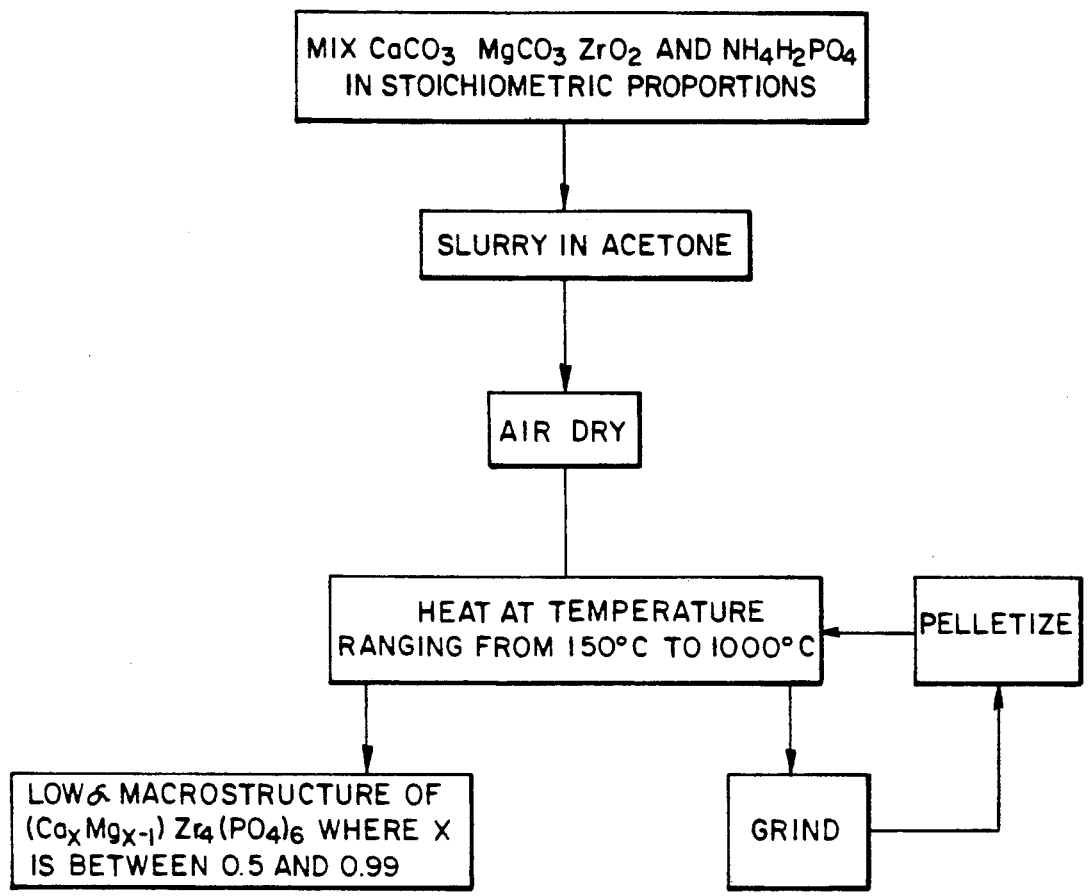
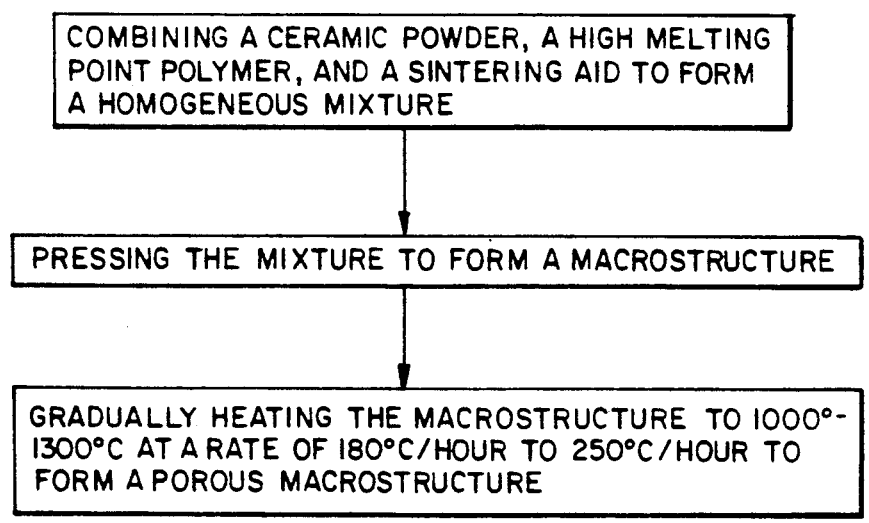
FIG. 6

CERAMIC MATERIALS WITH LOW THERMAL CONDUCTIVITY AND LOW COEFFICIENTS OF THERMAL EXPANSION

This invention was made with government support under Subcontract No. 86X-22049C awarded by Marin Marietta Energy Systems, Incorporated, acting under Contract DE-AC05-840R21400 with the Department of Energy. The government has certain rights in this invention.

FIELD OF THE INVENTION

The present invention relates to ceramic materials having low thermal conductivities and low coefficients of thermal expansion, and relates more particularly to calcium magnesium zirconium phosphate compounds which have near-zero coefficients of thermal expansion, low thermal conductivities, and which are stable at high temperatures.

BACKGROUND OF THE INVENTION

Ceramic materials having low thermal conductivities, low coefficients of thermal expansion, and stability at high temperatures are especially useful in modern technology for applications such as high-performance engines, spacecraft structure materials, and high-precision optics. Low thermal expansion materials ar particularly useful for high temperature applications, and for situations where cyclic heating and cooling are frequently incurred. If inexpensive, zero-thermal expansion, low thermal conductivity materials can be made that are stable at high temperatures, many problems facing modern technology will be eliminated or reduced.

For example, space shuttle tiles, which undergo radical increases and decreases in temperature during space missions, could be made from these improved materials; this would prevent the tiles from falling off the spacecraft, and help protect the astronauts therein. Thus, tiles made from low thermal conductivity, zero-thermal expansion materials, would make a major contribution to space exploration. Of course, this is just one use for low thermal expansion, low thermal conductivity materials, and a wide range of other technologies will benefit from the use of such materials.

Thermal Expansion And Contraction

Thermal expansion is generally attributed to the anharmonic thermal oscillation of atoms within a solid. Since the atoms vibrate about the mean position in an asymmetric potential energy well, the atoms vibrate with a larger amplitude in the energy well as the temperature of the solid is increased. At larger amplitudes, the asymmetry of the energy well causes the mean position of the atoms to shift, resulting in an overall dimensional change of the solid. The overall expansion of a solid is dependent upon the bulk linear thermal expansion coefficient, $\alpha$, which is determined by the thermal expansion coefficients along the principal axes of single crystals making up the bulk. When the thermal expansion coefficients along each of the principal axes in a crystal are equivalent, the material is said to be isotropic. When the thermal expansion coefficients along the principal axes are different, the material is said to be anisotropic.

Both thermal expansion and anisotropy contribute to internal stresses in a heated polycrystalline ceramic body. When the internal stress is large enough, cracks will form inside the ceramic body which influence the bulk thermal expansion and lower the mechanical strength of the ceramic macrostructure. Therefore, a low overall thermal expansion coefficient, $\alpha$, and a small degree of anisotropy can help to reduce the magnitude of internal stresses, and, thus, help to prevent failure in ceramic bodies that are subjected to high temperatures, or cyclic heating and cooling.

Certain materials are known to contract upon heating. With reference to FIG. 1, a three-dimensional framework structure 1 is illustrated to assist in demonstrating this principle. Polyhedra 2 are connected at corners 4 so that the expansion of structure 1 is the sum of the expansion of each polyhedron and a tilting effect. As the tilting angle $\phi$ increases, the overall length of structure 1 will tend to decrease, and, as the tilting angle $\phi$ decreases, structure 1 will tend to expand. If the polyhedra of the framework are rigid enough for changes of shape caused by heating to be negligible, the tilting effect will be the major contributor to expansion or contraction.

Sodium Zirconium Phosphate Structure

Sodium zirconium phosphates, $NaZr_2P_3O_{12}$, have been found to have low thermal expansion coefficients, and certain sodium zirconium phosphate (NZP) type materials have negative coefficients of thermal expansion. The basic NZP structure remains unchanged when sodium is replaced with certain other elements, such as other alkalis, alkaline earths, and transition metals. FIG. 2 is illustrative of the general NZP structure. The structure 10 basically consists of a three-dimensional network of $PO_4$ tetrahedra 12 and $ZrO_6$ octahedra 14 that are linked together by shared oxygens 16. Each zirconium atom 18 is located on a three-fold axis parallel to the c-axis, and is coordinated to six oxygens. Each phosphorous atom 20 is located on a two-fold axis parallel to the a-axis, and is coordinated to 4 oxygens. Thus each $ZrO_6$ octahedron is connected to six $PO_4$ tetrahedra through the six oxygen atoms making up the corners of the $ZrO_6$ octahedron. Sodium ions 22 are shown located at the interstitial sites created by the framework, but are replaced with other ions depending on the NZP analog.

The thermal expansion of alkaline earth zirconium phosphates has been examined by Limaye et al (hereinafter Limaye, in "Synthesis and Thermal Expansion of $MZr_4P_6O_{24}$ (M=Mg,Ca,Sr,Ba)," *J. Am. Ceram. Soc.*, 70 [10] C-232–C-236 (1987), herein incorporated by reference as if reproduced in full below. Limaye reported anisotropy in the axial thermal expansion coefficients of the alkaline earth zirconium phosphates formed. Calcium zirconium phosphate and strontium zirconium phosphate showed reversed anisotropy as well as opposite bulk thermal expansion. Within the temperature range of 25° C. to 500° C., Limaye observed that the axial expansion of calcium zirconium phosphate had anisotropy that was the reverse of strontium and barium zirconium phosphates (i.e., for calcium zirconium phosphate, $\alpha_a<0$ and $\alpha_c>0$, while for strontium and barium zirconium phosphates, $\alpha_a>0$ and $\alpha_c<0$).

In Limaye's, U.S. Pat. No. 4,801,566, herein incorporated by reference as if reproduced in full below, a $(Ca_{0.5}Sr_{0.5})Zr_4P_6O_{24}$ crystalline solid solution showed almost zero expansion and zero anisotropy. This result was achieved by combining calcium zirconium phosphate and strontium zirconium phosphate in the correct proportions so that their opposite anisotropies cancelled out to make crystalline solutions with near-zero thermal expansion and low anisotropy. Limaye also suggested that calcium barium zirconium phosphate compounds would have low thermal expansion properties, but strontium was the preferred ion because the density of the strontium substituted material was higher than the barium substituted material under equivalent processing conditions. This is because the barium ion has a larger size than the strontium ion, and, therefore, is not as mobile. The larger size of the barium ion requires longer heating times for barium ions to diffuse through the crystalline structure in comparison to strontium ions.

Strontium and barium calcium zirconium phosphates, SrCZPs and BaCZPs are expensive to make due to the short supply and expense of strontium and barium reagents. Note that Limaye also teaches that sintering time increases with the increasing atomic number of the alkaline earth element used. Thus, the mobility of barium and strontium ions in NZPs and CZPs should be less than that of calcium, magnesium, or beryllium ions. Since, magnesium is inexpensive, and large quantities of magnesium are available, a magnesium zirconium phosphate or calcium magnesium zirconium phosphate should require less time to produce than calcium strontium zirconium phosphates under equivalent processing conditions. However, Limaye was unsuccessful in preparing magnesium zirconium phosphates, even after calcination at 700° C. for sixteen hours, while calcium zirconium phosphates, barium zirconium phosphates, strontium zirconium phosphates, and calcium strontium zirconium phosphates were formed in shorter time periods under these reaction conditions.

Magnesium zirconium phosphate $MgZr_4(PO4)_6$ was synthesized by others using solid state reaction methods. However, the magnesium zirconium phosphate was found by Kazakos-Kijowski et al, in Mat. Res. Bull. 23, 11177-84, 1988, to decompose at temperatures of approximately 1000° C. into $Zr_2P_2O_9$. Further, it did not appear that a single phase calcium magnesium zirconium phosphate could be made due to the dissimilarity between the magnesium zirconium phosphate crystal structure and that of calcium zirconium phosphate or strontium zirconium phosphate; calcium zirconium phosphate has a hexagonal structure while magnesium zirconium phosphate has a monoclinic structure. However, magnesium zirconium phosphate has an important similarity with strontium and barium zirconium phosphates; it has opposite anisotropy to calcium zirconium phosphate.

Thus, it appeared from the prior art that calcium magnesium zirconium phosphates would be impossible to make, and it appeared that, even if a calcium magnesium zirconium phosphate could be made, the low thermal decomposition temperature of magnesium zirconium phosphate indicated that such a calcium magnesium zirconium phosphate would also decompose at low temperatures. Research into making calcium magnesium zirconium phosphates was further discouraged by the inability of Limaye to generate magnesium zirconium phosphates under the same processing times and conditions used for strontium and barium zirconium phosphates, despite teaching that alkaline earth elements having lower ionic radii should form single phase crystals more quickly than zirconium phosphates of alkaline earth elements with larger ionic radii. The inability to form single phase magnesium zirconium phosphates after treatment at 700° C. for sixteen hours, while calcium, strontium, and barium zirconium phosphates, having single phase crystalline structures, were formed at the same or lower temperatures and other shorter heating times, discouraged further research into the preparation and properties of magnesium zirconium phosphates and mixed calcium magnesium zirconium phosphates.

Komarneni, in "Hydrothermal Preparation of the Low-expansion NZP Family of Materials," *Int. J. High Technology Ceramics*, 4, (1988) 31-39, herein incorporated by reference as if reproduced in full below, also attempted to prepare single phase alkaline earth zirconium phosphates. Komarneni discovered that barium zirconium phosphate, strontium zirconium phosphate, and calcium zirconium phosphate crystallized from gels at 200° C. and formed rhombohedral structures. However, magnesium zirconium phosphate yielded 200 nm rhombohedra along with laths of 200×1000 nm. Analysis of the magnesium zirconium phosphate rhombohedra showed that the magnesium was concentrated in the laths, and absent from the rhombehedra; thus, the rhombohedra were probably $HZr_2(PO_4)_3$, while the laths were probably a layered zirconium phosphate. Single phase magnesium zirconium phosphate was not obtained even when less acidic gels of composition $2Mg(H_2PO_4)_2 \cdot 2HP_3O_4 \cdot 4ZrOCl_2$ were used under hydrothermal conditions at 200° C.

Thus, the difficulties that prior art researchers had in generating single phase high density magnesium zirconium phosphates, and the apparent instability that magnesium calcium zirconium phosphates would have at high temperatures discouraged research into the synthesis of calcium magnesium zirconium phosphates having near-zero coefficients of thermal expansion. Nevertheless, if calcium magnesium zirconium phosphates can be made that have near-zero coefficients of thermal expansion and that are stable at high temperatures, increases in the cost of producing such a material versus the cost of producing calcium strontium zirconium phosphates or calcium barium zirconium phosphates should be offset by the decreased cost in obtaining magnesium precursors versus strontium and barium precursors.

A critical element in selecting an appropriate low coefficient of thermal expansion material for use in high temperature applications is the thermal conductivity of the material. The prior art has concentrated on finding low thermal expansion materials, and neglected research into which low thermal expansion materials also have low thermal conductivities. An ideal material for use in high efficiency heat engines, spacecraft tiles, and other high technology uses, would have both a near-zero coefficient of thermal expansion and a low thermal conductivity. Further, since air is one of nature's best insulators, low density, porous ceramic macrostructures fabricated from a low-thermal expansion, low thermal conductivity materials which are stable at high temperatures would be ideal as insulators. For example, tiles made of this material could be utilized on spacecraft such a the space shuttle. These tiles would be less likely to expand and contract or conduct heat to the ship's hull during space missions, and, therefore, would be less likely to become detached from the spacecraft. If such materials could be made from calcium magnesium zirconium phosphate, a major hurdle in space exploration could be overcome at low cost.

Thus, there is a need for single phase calcium magnesium zirconium phosphates, and a process for producing them. Further, there is a need for calcium magnesium zirconium phosphates that have near-zero coefficients of thermal expansion and low thermal conductivities, which are stable at high temperatures. Further, there is a need for porous ceramic materials made from calcium magnesium zirconium phosphates that can serve as insulators for spacecraft or that can be used in other high temperature applications, such as, but not limited to, the filtration of molten metals.

SUMMARY OF THE INVENTION

The present invention relates to the production of calcium magnesium zirconium phosphates having the following general formula: $(Ca_xMg_{1-x})Zr_4(PO_4)_6$ where x is between 0.5 and 0.99. The calcium magnesium zirconium phosphate, MgCZP, materials are single phase and stable at temperatures above 1300° C. for at least 50 hours. In a preferred embodiment, x is between 0.5 and 0.8, and, for temperatures ranging from room temperature to about 1200° C., the coefficient of thermal expansion is about zero and the thermal conductivity ranges from about 0.5 W/m°K. (watts/meters degrees Kelvin) to about 2.0 W/m°K.

In a preferred embodiment, MgCZP materials are generated by first combining aqueous 1M $Mg(NO_3)_2$, aqueous 1M $Ca(NO_3)_2$, and aqueous 1M $ZrO(NO_3)_2$, and adjusting the pH of the solution with ammonium hydroxide, $NH_4OH$, to about pH 7. Ammonium dihydrogen phosphate, 1M $NH_4H_2PO_4$, is then added drop by drop while stirring the solution to form a calcium-magnesium-zirconium precipitate. Water is evaporated from the precipitate to form a gel, and the gel is calcined at temperatures ranging from 300° C. to 950° C. to form calcium magnesium zirconium phosphates. The ratio of calcium to magnesium is altered by adjusting the quantity of calcium nitrate solution that is combined with the magnesium nitrate solution. Calcination at temperatures below approximately 600° C. for periods of time ranging from about 2 hours to about 48 hours forms an amorphous phase powder which is useful in producing a vitreous surface on macrostructures sintered from the amorphous powder. Shorter heating times may result in incomplete calcination. In a preferred embodiment, the gel is sintered at 900° C. for 16 to 36 hours to form $(Ca_xMg_{1-x})Zr_4(PO_4)_6$ where x is between 0.5 and 0.99. Macrostructures of the crystalline MgCZP powder are formed by sintering quantities of the powder at temperatures ranging from 1100° C. to 1400° C. for various time periods.

An alternative process involves the drop-wise addition of ammonium dihydrogen phosphate to an aqueous solution of magnesium, calcium, and zirconium nitrate. The addition of the ammonium dihydrogen phosphate to the first solution causes a zirconium containing precipitate to form. After formation of the zirconium containing precipitate, the pH of the solution is adjusted with ammonium hydroxide to between pH 8 and pH 9 to coprecipitate calcium and magnesium containing compounds. The calcium, magnesium, and zirconium containing precipitate forms a gel which is then dried, and calcined at temperatures ranging from about 350° C. to about 950° C. Temperatures below about 600° C. produce an amorphous phase powder, and temperatures above 600° C. produce a crystalline phase power of calcium magnesium zirconium phosphate. In a preferred embodiment, the pH is adjusted to about pH 8.5, and calcination is carried out at 900° C. for 24 hours or at 600° C. for 72 hours to form single phase crystalline calcium magnesium zirconium phosphate.

We have discovered that compounds of $(Ca_xMg_{1-x})Zr_4(PO_4)_6$ where x is between 0.5 and 0.8 have near-zero coefficients of thermal expansion, and thermal conductivities below 0.6 W/M°K. Further, certain single phase calcium magnesium zirconium phosphate compounds have been stable at temperatures of about 1400° C. for at least 72 hours. In a preferred embodiment, $(Ca_{0.6}Mg_{0.4})Zr_4(PO_4)_6$ has been formed into a ceramic macrostructure, and sintered to have a density that is 94% of the maximum theoretical density possible for the pure solid. The small particle size generated by the preferred sol-gel processes of the present invention reduces sintering time for generation of single phase ceramic macrostructures of the MgCZP materials in comparison to solid state reaction times and produces high density macrostructures with better mechanical properties than is possible using the solid state reaction.

Porous light weight ceramic materials of $(Ca_xMg_{1-x})Zr_4(PO_4)_6$ where x is between 0.5 and 0.99 are formed, in a preferred embodiment, by making a slurry of MgCZP powder with water and a binder, and coating a polymeric foam with the slurry. When the polymeric foam is saturated with the slurry, and gradually heated to temperatures ranging from 1000° C. to about 1300° C., the foam is pyrolyzed, and a rigid porous ceramic macrostructure of MgCZP results that has pore sizes which depend upon the pore sizes in the foam. In a preferred embodiment, the foam and resulting macrostructure have pore sizes ranging from about 150 μm to 250 μm. Preferred rates for increasing the temperature range from about 180° C. per hour to about 250° C. per hour.

An alternative process for producing porous ceramic macrostructures of MgCZP involves combining MgCZP powder with a high melting point polymer and a binder to form a homogeneous mixture. The homogeneous mixture is then pressed to form a macrostructure of the desired shape and size, and sintered at temperatures ranging from 1000° C. to 1300° C. to form a porous macrostructure. Preferred polymers include polyvinyl chloride and polytetrafluoroethylene, although other polymers known to those of skill in the art may be used. The porous macrostructure has pore sizes which depend upon the particle size of the polymeric powder used. In a preferred embodiment, a powdered polymer having a particle size of 30 μm produced a porous macrostructure with pore sizes ranging from between 20 μm and 40 μm. A preferred binder is methyl cellulose or cellulose ether. In a preferred embodiment, ZnO is added as a sintering agent.

Thus, a primary object of the present invention is to generate calcium magnesium zirconium phosphates having near-zero coefficients of thermal expansion, low thermal conductivities, and stability at high temperatures.

It is a further object of the present invention to generate calcium magnesium zirconium phosphates by simple and inexpensive methods.

It is yet another object of the present invention to generate calcium magnesium zirconium phosphate macrostructures having low bulk thermal expansion and low thermal conductivity which are stable at high temperatures.

It is still another object of the present invention to generate porous calcium magnesium zirconium phosphate macrostructures and a process for making them.

DESCRIPTION OF THE DRAWINGS

FIG. 3 is a flowchart of a preferred process for solid state production of the MgCZP materials of the present invention.

FIG. 6 is a flowchart of an alternative process for producing porous macrostructures from the MgCZP materials of the present invention.

DETAILED DESCRIPTION OF THE INVENTION

Figure 1:
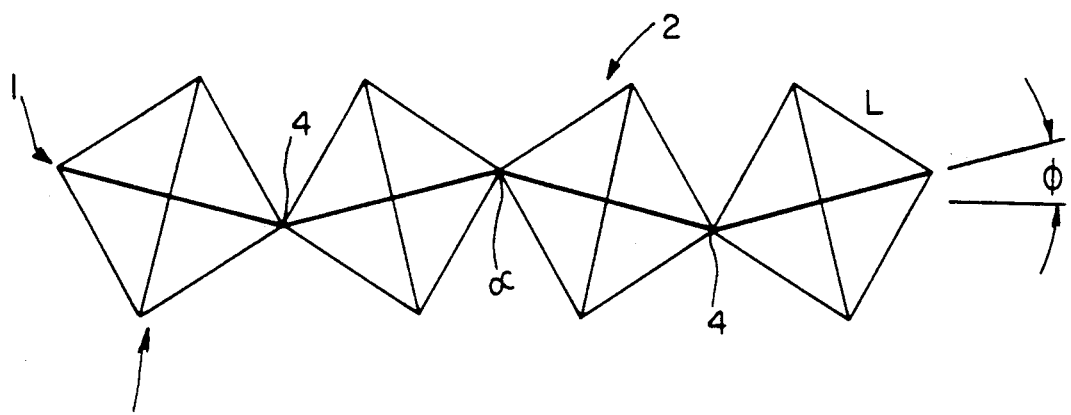
FIG. 1 illustrates a framework structure constructed by tetrahedra linked at corners.

Prior art sodium zirconium phosphates, NZPs, have been generated using both solid state and sol-gel processes. The solid state reactions are generally carried out by combining the necessary reactants in powdered form, and heating the combined powders at high temperatures. This is usually performed in several steps with the powdered materials being mixed together, heated to form a solid, and then ground to a powder before pressing and heating again. This is repeated until a solid macrostructure of the desired density is formed.

If a one step solid state reaction is attempted, macrostructures with stress fractures result, or, due to the escape of reaction gases, a stable solid cannot be formed. It is also difficult to get a truly homogeneous mixture of the powdered reactants on a molecular scale by using the solid state reaction, even with the addition as a mixing lubricant such as acetone. Thus, macrostructures resulting from the solid state reaction method have densities which are far less than the theoretical maximum density for the crystal being formed, and long reaction times at high temperatures are required to achieve formation of a single phase crystal.

Solid-State Reaction

Calcium magnesium zirconium phosphates, (Ca$_x$Mg$_{1-x}$)Zr$_4$(PO$_4$)$_6$ where x is between 0.5 and 1.0, were produced by a solid state reaction method. In a preferred embodiment, calcium carbonate, magnesium carbonate, zirconium dioxide, and ammonium dihydrogen phosphate powders were mixed with acetone to form a homogeneous mixture. The mixture was then heated to evaporate the acetone. Initial heating of the mixture was at low temperatures; afterwhich, the material was ground to a powder and remixed. After remixing, the powder was treated at progressively higher temperatures. Single phase solid solutions of (Ca$_x$Mg$_{1-x}$)Zr$_4$(PO$_4$)$_6$ where x is between 0.5 and 0.99 were formed at temperatures ranging from 1100° C. to 1300° C.

However, the resulting structures had densities of only 65% to 80% of the maximum theoretical densities possible. Because of their low-density, the macrostructures formed have substantially less mechanical strength than macrostructures that approach the maximum theoretical density possible. Further, a large number of grinding, mixing, and heating steps were required to form even low-density MgCZP macrostructures using the solid state reaction method.

Sol-Gel Method

The sol-gel process involves the formation of sol particles that are coagulated into a gel. Basically, the suspension of sol particles is transformed from a liquid-like state which will not support sheer stresses to an elastic gel material that is resistant to sheer stresses. The major advantage of the sol-gel method over the solid state reaction technique is the microhomogeneity of the solution formed, and the high surface area of the dried gel. This powder yields a higher crystallinity after shorter calcining times at lower temperatures, and results in a higher density for the sintered macrostructures formed from the powder.

Limaye, in the aforementioned U.S. Pat. No. 4,801,566, utilized a sol-gel method to overcome problems with solid state reaction methods to produce a higher density (Ca$_{0.5}$Sr$_{0.5}$)Zr$_4$P$_6$O$_{24}$ composition. The Limaye sol-gel method consists of combining aqueous solutions of calcium nitrate, Ca(NO$_3$)$_2$, strontium nitrate. SrCa(NO$_3$)$_2$, and ZrOCl$_2$·8H$_2$O together, and adding to the combined solutions ammonium dihydrogen phosphate solution drop by drop with constant stirring. The addition of the first drop of ammonium dihydrogen phosphate forms a milky cluster, which was attributed by Limaye to the formation of a zirconium phosphate complex. When ammonium dihydrogen phosphate was added directly to a zirconium chloride solution, a milky solution resulted; if calcium or strontium nitrates were then added after this step, poor mixing and precipitation resulted.

Limaye was unable to form stable magnesium zirconium phosphate complexes, and, therefore, did not make any attempts to generate calcium magnesium zirconium phosphates, and Limaye's work indicates that such compounds are impossible to make. Due to the long heating times required and the low density of the materials obtained by the solid state reaction method, we were motivated to use a sol-gel procedure to produce magnesium calcium zirconium phosphates. We have overcome the problems faced by the prior art in forming calcium magnesium zirconium phosphate, MgCZP, materials by modifying the sol-gel process used by Limaye.

We have discovered that by carefully adjusting the pH of solutions of calcium, magnesium, and zirconium nitrates prior to, or after, the addition of ammonium dihydrogen phosphate, complexes of calcium magnesium zirconium phosphate form a sol which is easily dehydrated to a gel. Upon calcination of the gel, we have been able to form stable compounds of the following general formula: (Ca$_x$Mg$_{1-x}$)Zr$_4$(PO$_4$)$_6$ where x is between 0.5 and 0.99. The MgCZP compounds of the present invention not only have near-zero coefficients of thermal expansion, but, we have also discovered that, despite the instability of magnesium zirconium phosphates at 1000° C., certain MgCZP materials of the present invention are stable at temperatures above 1400° C. for periods of time in excess of 72 hours.

We have further discovered that the MgCZP materials of the present invention have very low thermal conductivities. The low thermal conductivities, low coefficients of thermal expansion, and the stability at high temperatures of the MgCZP materials of the present invention make them ideal candidates for use as insulators and as structural support materials in high-temperature applications. Further, the sol-gel process of the present invention is only slightly more expensive than the sol-gel process used by Limaye to produce calcium strontium zirconium phosphates; the additional expense is just for the pH adjusting agents, and this extra cost is far offset by the lower cost of magnesium reagents when compared to the cost of strontium reagents.

General Processes

With reference to FIG. 3, a preferred solid state reaction method is presented in flow chart form. The basic process steps include mixing calcium carbonate, magnesium carbonate, zirconium oxide, and ammonium dihydrogen phosphate in stoichiometric proportions, and homogenizing the mixture by slurrying in acetone. The mixture is air dried to remove the acetone, and heated at temperatures ranging from 150° C. to 1400° C. Before each heating step the material is pelletized; after each heating step the material is ground to a powder. Once the requisite degree of crystallinity and density is achieved, the low coefficient of thermal expansion macrostructure is ready for use.

Figure 4:
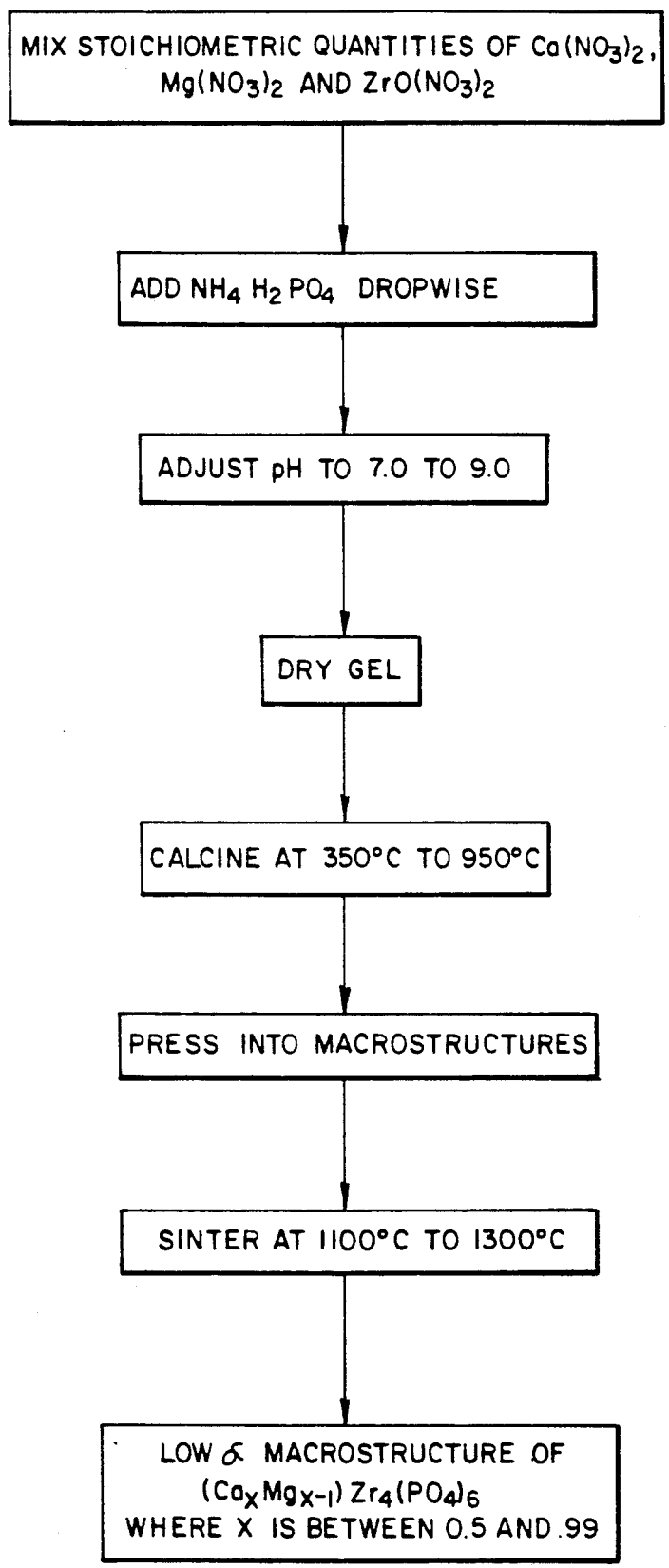
FIG. 4 is a flowchart of a preferred embodiment of a sol-gel process for producing the MgCZP materials of the present invention.

With reference to FIG. 4, a basic process flow chart is presented for the sol-gel process of the invention. Stoichiometric quantities of calcium, magnesium, and zirconium nitrates are combined in the first step, and ammonium dihydrogen phosphate is then added dropwise to form a zirconium-containing precipitant. The pH is adjusted afterwards to between 6 and 10 (preferrably between 7 and 9) to coprecipitate calcium and magnesium complexes. The sol is dehydrated to form a gel, and the gel is calcined at 350° C. to 950° C.; the gel is calcined to form an amorphous powder at temperatures beneath 600° C. and a crystalline powder at temperatures above 600° C. The powder is then pressed into macrostructures of various shapes and sizes, and sintered at temperatures between 1100° C. to 1300° C. to form macrostructures of calcium magnesium zirconium phosphate $(Ca_xMg_{x-1})Zr_4(PO_4)_6$ where x is between 0.5 and 0.99.

In an alternative embodiment the pH of the calcium, magnesium, and zirconium nitrate solution is adjusted prior to the dropwise addition of ammonium dihydrogen phosphate. We have discovered that by adjusting the pH prior to the addition of ammonium dihydrogen phosphate, particle sizes of between about 30 nm and 50 nm result; when the pH is adjusted after the addition of ammonium dihydrogen phosphate, particle sizes of between about 10 nm to about 30 nm result. These small particle sizes enable the formation of a single phase solid solution of calcium magnesium zirconium phosphate after shorter sintering times than is possible using a solid state reaction method, and the resulting macrostructures have a greater density than is possible with the solid state reaction method.

Figure 5:
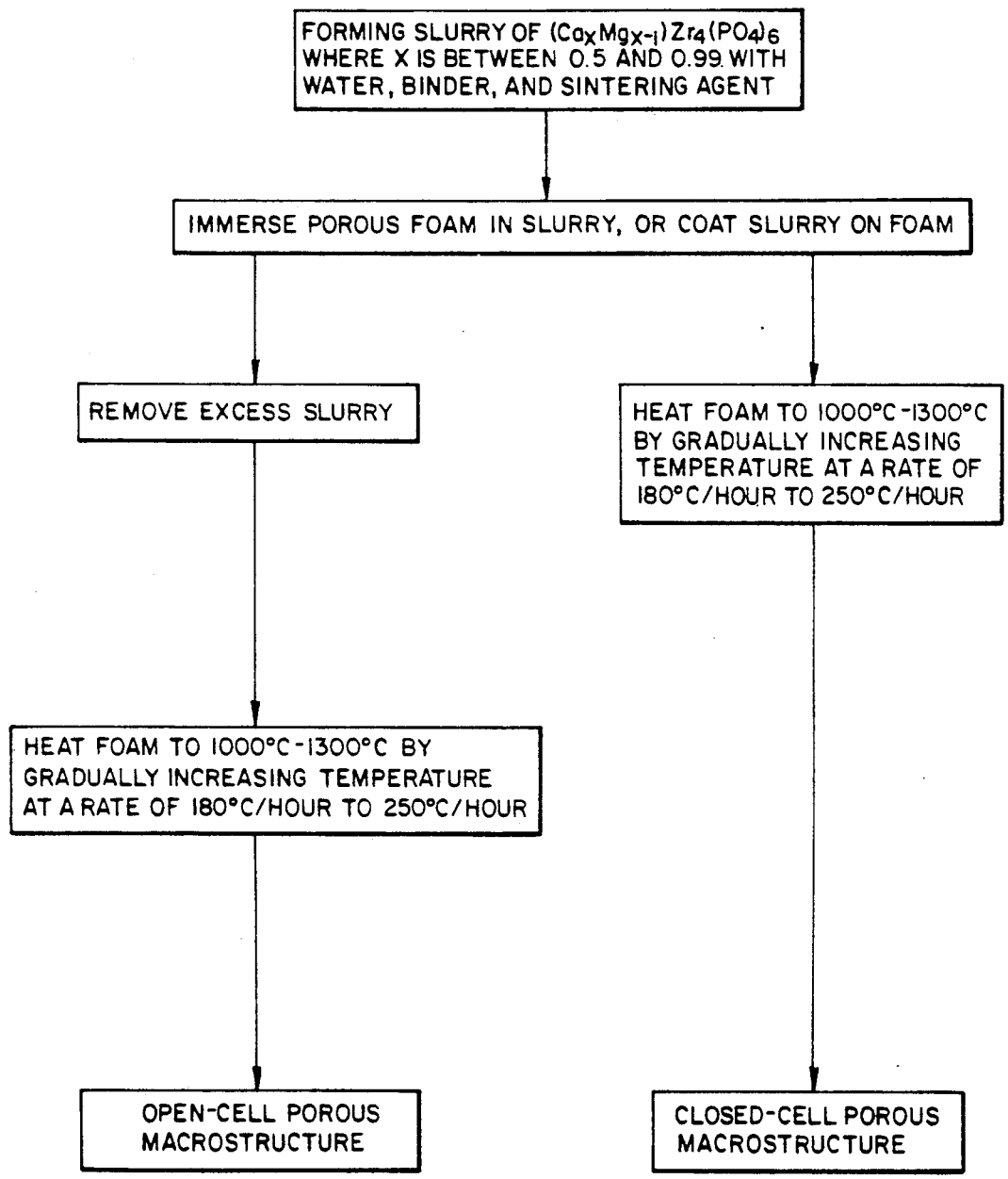
FIG. 5 is a flowchart of processes for producing open-cell and closed-cell porous macrostructures of the MgCZP materials of the present invention.

With reference with FIG. 5, a flow chart is presented of a preferred process for producing open-cell and closed-cell porous macrostructures from the calcium magnesium zirconium phosphates of the present invention. In the first step, a slurry of calcium magnesium zirconium phosphate powder is combined with water, a binder, and a sintering agent. A flexible porous foam having the shape of the desired macrostructure is then immersed in the slurry, or coated with the slurry. If an open-cell porous macrostructure is desired, excess slurry is removed (e.g., by squeezing or shaking the porous foam), and the coated foam is then heated to temperatures ranging from 1000° C. to 1300° C.; it is important to gradually increase the temperature from about room temperature to the sintering temperature since rapid pyrolysis of the foam material will disrupt the uniformity of the resulting macrostructure. Therefore, a preferred temperature ramp rate is between about 180° C. per hour and about 250° C. per hour. A closed-cell porous macrostructure, is formed in the same way as the open-celled porous macrostructure, except that excess slurry is not removed from the foam prior to heating.

An alternative embodiment of the process for producing porous zirconium phosphate macrostructures is presented in FIG. 6, and involves first combining a ceramic powder, a powder of a high melting point polymer, and a binder. After mixing to homogenize the ceramic powder, polymer, and binder, the mixture is pressed into the desired shape of the macrostructure, and gradually heated at a rate of about 180° C. per hour to about 250° C. per hour from room temperature to temperatures ranging from 1000° C. to 1300° C. The porosity of the resulting macrostructure is highly dependent on the particle size of the polymeric powder used; generally, the smaller the particle size of the polymer used, the smaller the pores in the resulting macrostructure.

EXAMPLE 1

$CaCO_3$(1.95 g), $MgCO_3$(1.88 g), $ZrO_2$(19.3 g), and $NH_4H_2PO_4$(27.05 g) were homogenized for several hours in an acetone solution. Samples were taken from the acetone slurry and heated in stages at temperatures ranging from 150° C. to 1300° C. Note that the reagents used were not anhydrous, and quantities used were adjusted to account for the moisture contained therein (thermogravimetric analysis was used to determine moisture content). After each heating stage, the samples were reground into a fine powder using a mortar and pestle. Once the desired number of heating steps were complete, the final products were identified by standard powder X-ray defraction methods. The single phase solid solution powder material was then/pressed and sintered into a variety of shapes. Better bulk densities were obtained when a sintering agent, such as 1% ZnO, was added prior to sintering. For example, samples made without using a sintering aid had maximum densities of approximately 80% of the maximum theoretical density; samples made with a sintering aid had densities of about 85% to 90% of the maximum density possible, but these samples lacked stability at high temperatures. This was attributed to the ZnO sintering aid which is not as stable as the MgCZP materials.

EXAMPLE 2

Single phase powder samples of calcium zirconium phosphate and magnesium zirconium phosphate were formed using the solid state reaction process of Example 1. Once $CaZr_4(PO_4)_6$ and $MgZr_4(PO_4)_6$ compositions were identified, they were mixed in the appropriate molar percentages, and heat treated at temperatures between 1100° C. and 1300° C. until the appropriate solid solution material was formed.

Bulk thermal expansion coefficients were determined for the single phase materials formed from the solid state reaction method of the present invention. Samples were sintered into bars, and heated from 30° C. to 1000° C. in a Netzsch dual push rod differential dilatometer. The average bulk thermal expansions of the calcium magnesium zirconium phosphates are presented below in Table 1.

TABLE 1

AVERAGE BULK THERMAL EXPANSION OF $(Ca_xMg_{1.0-x})Zr_4(PO_4)_6$ WHERE X = 1.0 TO 0.5 (0.1 INTERVALS)

| X | Average Bulk CTE (30–1000° C.) |
|---|---|
| 1.0 | $-11.6 \times 10^{-7}/°C.$ |
| 0.9 | $-7.9 \times 10^{-7}/°C.$ |
| 0.8 | $-12.9 \times 10^{-7}/°C.$ |
| 0.7 | $-9.6 \times 10^{-7}/°C.$ |
| 0.6 | $1.0 \times 10^{-7}/°C.$ |
| 0.5 | $2.6 \times 10^{-7}/°C.$ |

Note that as x decreases from 1.0 to 0.5, the average bulk coefficient of thermal expansion goes from a negative number to a positive number. It is apparent from Table 1 that the average bulk coefficient of thermal expansion will be zero for a composition having x somewhere between 0.6 and 0.7.

Samples of $(Ca_xMg_{1-x})Zr_4(PO_4)_6$ where x is between 0.5 and 1.0 were treated at 1400° C. for periods of time exceeding 72 hours. X-ray defraction data indicate that the single phase compositions remained stable. However, some samples exhibited slight decomposition, and formed secondary phases of $Zr_2P_2O_9$. Additional tests at 1350° C. showed the onset of $Zr_2P_2O_9$ formation after approximately 60 hours. It appears that $(Ca_xMg_{x-1})Zr_4(PO_4)_6$ where x is between 0.5 and 0.99 should remain stable in the single phase form for at least 50 hours at temperatures of approximately 1300° C. This is a surprising result when one considers that magnesium zirconium phosphates begin to decompose at approximately 1000° C.

Figure 7:
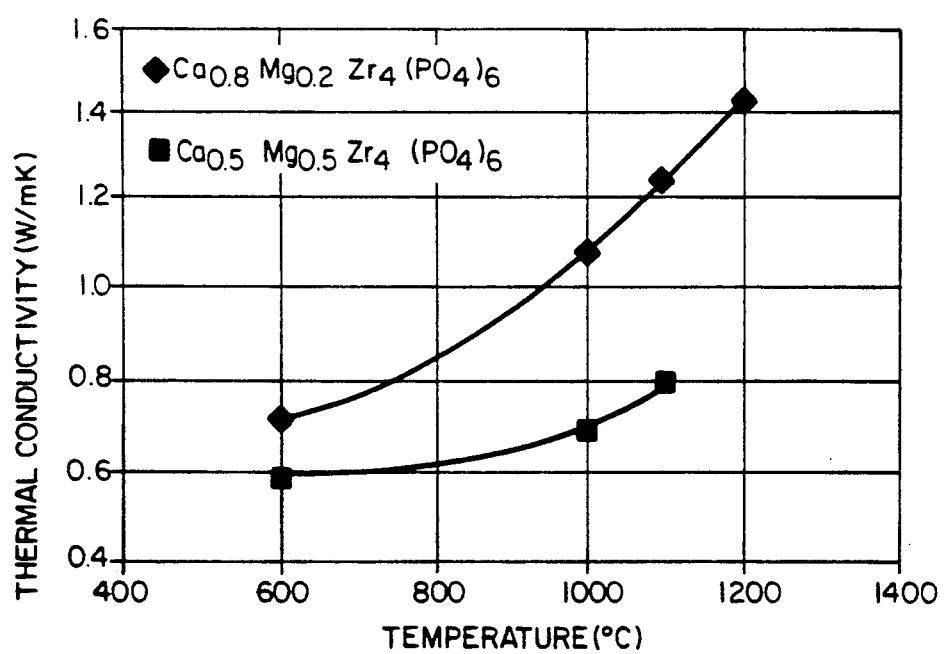
FIG. 7 is a graphic illustration of thermal conductivity versus temperature for (Ca$_{0.5}$Mg$_{0.5}$)Zr$_4$(PO$_4$)$_6$ and (Ca$_{0.8}$Mg$_{0.6}$)Zr$_4$(PO$_4$)$_6$.
Figure 2:
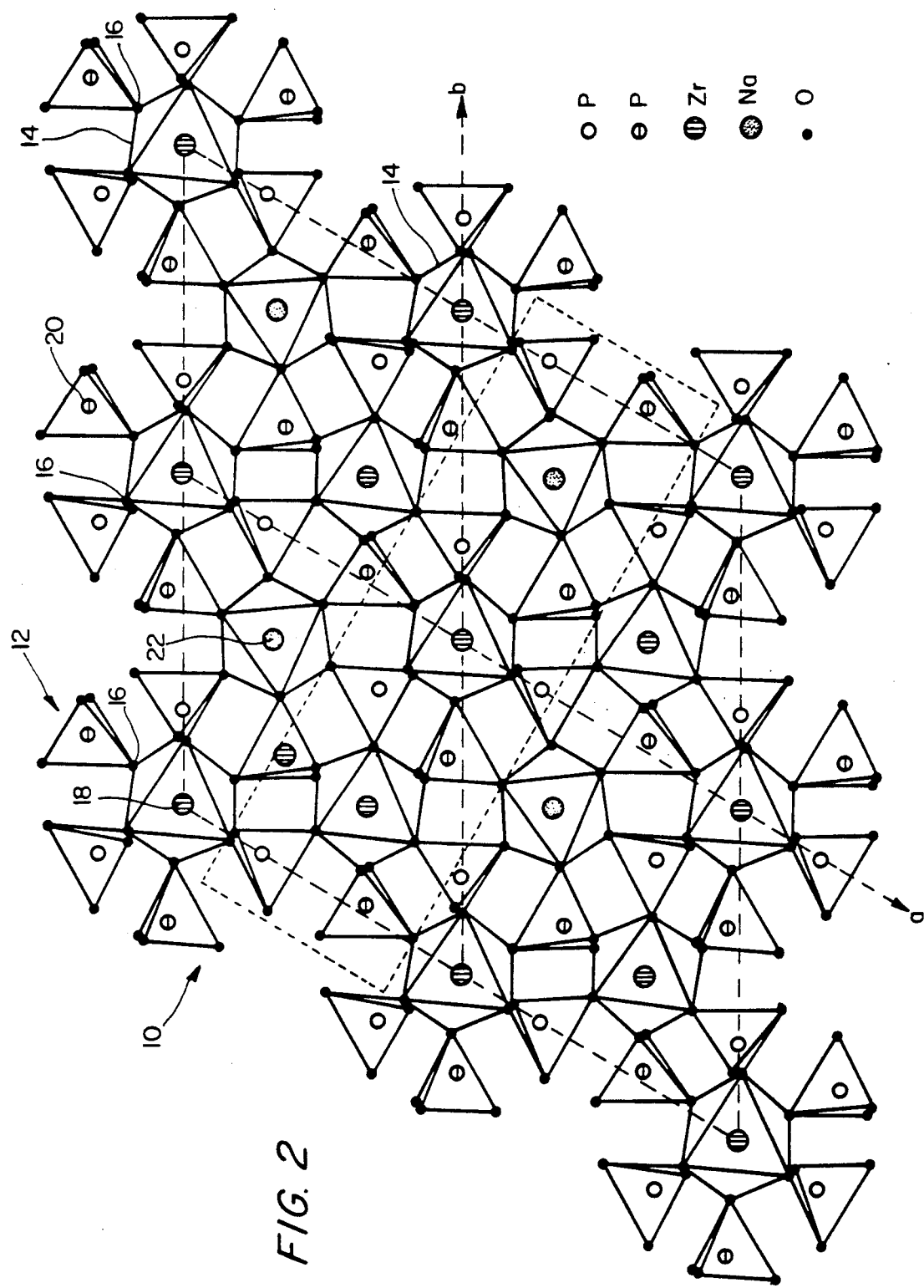
FIG. 2 is a projection of the NaZr$_2$(PO$_4$)$_3$ structure perpendicular to the c-axis.

With reference to FIG. 7, single phase $Ca_{0.5}Mg_{0.5}Zr_4(PO_4)_6$ and $Ca_{0.8}Mg_{0.2}Zr_4(PO_4)_6$ compositions were subjected to thermal diffusivity tests at the Oak Ridge National Laboratories. Thermal diffusivities were determined using the laser flash thermal diffusivity technique at temperatures from 20° C. to 1200° C. Note that the thermal diffusivity at temperatures beneath 600° C. was too low to be determined. The thermal conductivity was derived from the thermal diffusivities by multiplying the thermal diffusivity values by the density and the heat capacity. The thermal conductivity values are presented in FIG. 7. Note that the thermal conductivities for the MgCZP materials having x 32 0.5 ranged from beneath 0.6 W/m°K. to beneath 0.8 W/m°K. The MgCZP material having x=0.8 had a much higher thermal conductivity over the temperature range of 600° C. to 1200° C. This indicates that larger quantities of magnesium contribute to lowering the average thermal conductivity of MgCZP materials.

Thermal conductivities were also determined using the hot plate method at temperatures ranging from approximately 20° C. to 100° C. The thermal conductivity ranged from just below 0.6 W/m°K. (watts per meter degree Kelvin) to approximately 0.5 W/m°K. These unusually low thermal conductivities make the calcium magnesium zirconium phosphates of the present invention excellent insulators. It is important to note that the thermal conductivities for the calcium magnesium zirconium phosphates of the present invention are well below that of partially stablized $ZrO_2$, one of the most common high temperature ceramic thermal barrier materials in use today ($ZrO_2$ has a high coefficient of thermal expansion, and has thermal conductivities above 2.0 W/m°K.).

EXAMPLE 3

A sol-gel method was used to generate calcium magnesium zirconium phosphate, MgCZP, powders. $Ca(NO_3)_2 \cdot 4H_2O$, $Mg(NO_3)_2 \cdot 6H_2O$. $ZrO(NO_3)_2 \cdot xH_2O$. and $NH_4H_2PO_4$ were dissolved separately in deionized water to form 1.0 molar solutions. In alternative embodiments, the nitrates can be produced by dissolving calcium carbonate or magnesium carbonate in nitric acid, or commercial nitrate solutions can be used. The calcium and magnesium nitrates were then combined in the desired molar ratio (i.e., the ratio of calcium to magnesium was 1.0 or greater). Note that it was difficult to form stable, single phase calcium magnesium zirconium phosphates of the general formula $(Ca_xMg_{1-x})Zr_4(PO_4)_6$ when x is below 0.5.

While stirring the calcium-magnesium-zirconium nitrate solution, a 1.0 molar ammonium hydroxide solution was added drop by drop to adjust the pH value of the solution to about pH 7. The ammonium dihydrogen phosphate solution was then added slowly until a stoichiometric quantity of phosphate was added. The pH value of the solution was maintained at 7 until all the phosphate wa added. The solution was stirred an additional 20–30 minutes, and the water and ammonia were then evaporated by heating the solution to 60°–80° C. for 12–16 hours until a dried gel material formed. The dried gel was then calcined at about 700° C. for 16 hours to produce a fine grain MgCZP powder with a particle size ranging from 30 nm to 50 nm as measured transmission electron microscopy, TEM.

The MgCZP powder was then pressed without using polymeric binders or sintering aids to form a macrostructure. The macrostructure was sintered in two successive stages; first the macrostructure was heated to 1200° C., and then a second heating step was carried out at 1200° C. to 1350° C. Sample bulk densities of $(Ca_xMg_{1.0-x})Zr_4(PO_4)_6$ where x=0.1 to 1.0 were measured after firing at temperatures of 1200° C., 1250° C., and 1320° C. The results are presented in Table 2 below.

TABLE 2

BULK DENSITY OF $(Ca_xMg_{1.0-x})Zr_4(PO_4)_6$
Bulk Density (g/cm³)

| X | 1200° C. | 1250° C. | 1320° C. |
|---|---|---|---|
| 1.0 | 2.92 | 3.02 | 3.15 |
| 0.9 | 2.84 | 2.92 | 3.01 |
| 0.8 | 2.77 | 2.92 | 2.97 |
| 0.7 | 2.64 | 2.81 | 3.00 |
| 0.6 | 2.66 | 2.76 | 3.01 |
| 0.5 | 2.94 | 2.96 | 3.01 |
| 0.4 | 2.81 | 2.82 | 2.92 |
| 0.3 | 2.84 | 2.79 | 2.88 |
| 0.2 | 2.91 | 2.98 | 3.01 |
| 0.1 | 2.62 | 2.71 | 2.90 |
| 0.0 | 2.78 | 2.94 | 3.09 |

Note that the bulk density increases initially With increasing amount of substituted $Mg^{2+}$ ions. This indicates that as more $Ca^{2+}$ ions are replaced by smaller and lighter $Mg^{2+}$ ions, the more difficult it is to sinter the powder. This is exactly the opposite behavior than would be expected; in fact, Limaye et al, in the aforementioned U.S. Pat. No. 4,801,566, teach that:

> [S]intering time increases with increasing atomic number of the alkaline earth cation. Since the mobility of the cation is lowered as the atomic number increases, longer holding times and higher temperatures are required.

It is believed that the variations in Table 2 for compositions having x less than 0.5 could be caused by the formation of low-density secondary phases such as $Zr_2P_2O_9$ and $ZrP_2O_7$, or by thermal decomposition of $(Ca_xMg_{1.0-x})Zr_4(PO_4)_6$ into $CaZr_4(PO_4)_6$ and other phases.

Thermal expansion measurements were also made on sintered bars which had a density of more than 90% of the maximum theoretical density possible. X-ray defraction patterns demonstrated that single phase compounds of $(Ca_xMg_{1-x})Zr_4(PO_4)_6$ with x less than 0.5 were not obtained. Coefficients of thermal expansion for $(Ca_xMg_{1-x})Zr_4(PO_4)_6$ compounds of the present invention, measured over three temperature ranges (30°–1000° C., 30°–700° C., and 700°–1000° C.), are presented in Table 3 below.

TABLE 3

Average Coefficient of Thermal Expansion of $(Ca_xMg_{1.0-x})Zr_4(PO_4)_6$

| | Average CTE ($10^{-6}$/°C.) | | |
|---|---|---|---|
| x | 30–1000° C. | 30–700° C. | 700–1000° C. |
| 1.0 | −2.76 | −3.84 | −0.18 |
| 0.9 | −2.71 | −3.70 | −2.25 |
| 0.8 | −2.16 | −2.26 | −2.00 |
| 0.7 | +1.12 | +0.59 | +2.30 |
| 0.6 | +0.87 | +0.54 | +1.67 |
| 0.5 | +1.15 | +0.76 | +1.93 |
| 0.4 | +0.47 | +0.16 | +1.16 |
| 0.3 | +2.30 | +2.09 | +2.80 |
| 0.2 | +3.60 | +3.75 | +3.41 |
| 0.1 | +2.93 | +3.08 | +2.61 |
| 0.0 | +2.82 | +2.79 | +2.81 |

Note that the CTE increases from a negative value to a positive value with decreasing x. The data in Table 3 indicate that a $(Ca_xMg_{1-x})Zr_4(PO_4)_6$ composition with x somewhere between 0.7 and 0.8 should have a near-zero CTE.

EXAMPLE 4

A calcium and magnesium nitrate solution having the desired Ca/Mg ratio was prepared and combined with a zirconium nitrate solution; ammonium dihydrogen phosphate solution was then added to the mixed nitrate solution drop by drop with constant stirring. Following the addition of the ammonium dihydrogen phosphate solution, ammonium hydroxide was added to adjust the pH of the samples to between pH 8 and pH 9; this caused the formation of homogeneous gels. The gels were dried at 40° C. to 60° C. for 24 hours with constant stirring, and then dried at 110° C. for 12 hours. Some samples were calcined at 350° C. for 10 hours to produce amorphous powders, and other samples were treated at 600° C. for 72 hours or at 850° C. to 900° C. for 10 hours to create a crystalline powder. The powder formed had particles ranging in size from about 10 nm to 30 nm, and had an average particle size of 20 nm as determined by TEM.

Samples of the amorphous phase powder weighing 20 grams each, were hot pressed at 1200° C. under 10 to 14 MPa for time periods ranging from three to ten hours. After hot pressing, the resulting macrostructures were annealed at 1200° C. for 20 to 30 hours. This resulted in the formation of single phase MgCZP ceramics with a vitreous exterior. Samples of the amorphous phase powder were also cold pressed at 200 MPa to form 1.8 gram bars and 0.8 gram plates. The bar and plate macrostructures were sintered at 1100° C. to 1400° C. for time periods ranging from 24 to 72 hours. The macrostructures achieved densities of up to 97% of the maximum theoretical density as determined by ASTM standard method C-135.

We have discovered that the pH of sol-gel solutions used in the present invention also determines whether secondary phases will be formed. When the pH is below 6.0, single phase MgCZP materials were not formed even after calcination at 900° C. for 72 hours. However, for sol-gel solutions with a pH in excess of 6.0, single phase MgCZP is formed. Further, the time required to form a single phase MgCZP material at 900° C. has been found to decrease between pH 6 and pH 9. Table 4 below lists sol-gel solution pH versus calcination time at 900° C. required to form single phase or mixed phase MgCZP materials.

TABLE 4

| pH of Sol-Gel | Calcination Time at 900° C. to Form Single Phase MgCZP Material |
|---|---|
| pH 1 | Unable to form single phase after 65 hrs |
| pH 2 | Unable to form single phase after 72 hrs |
| pH 3 | Unable to form single phase after 72 hrs |
| pH 4 | Unable to form single phase after 84 hrs |
| pH 5.5 | Unable to form single phase after 60 hrs |
| pH 6.7 | Formed single phase after 60 hrs |
| pH 7 | Formed single phase after 36 hrs |
| pH 7.5 | Formed single phase within 30 hrs |
| pH 8 | Formed single phase within 30 hrs |
| pH 8.5 | Formed single phase within 24 hrs |

Table 4 shows a clear correlation between the pH of the solution used to form a sol of calcium, magnesium, and zirconium precipitants, and the ability to form a single phase MgCZP material. The secondary phase is formed when the pH is below 6.0, and is believed to consist of $Zr_2P_2O_9$ and/or $ZrP_2O_7$.

Thus, we have discovered that the pH of the sol-gel solution, the calcination time, and the ratio of calcium to magnesium are important elements in forming stable MgCZP materials. Further, the order of solution mixing is critical; if the correct order of mixing is not followed, $Zr_2P_2O_9$ or $ZrP_2O_7$ appear as undesirable secondary phases in the calcined powders. It is believed that when ammonium dihydrogen phosphate is added to a solution of zirconium, calcium, and magnesium nitrates, $Zr(H_2PO_4)_4$ is precipitated alone. The addition of ammonium hydroxide to this solution causes the formation of a mixed colloidal suspension when the pH rises above approximately 6.5, and preferrably when the pH is between pH 8 and pH 9. It is believed that a pH between 6 and 10 causes the formation of $Ca(H_2PO_4)_2$ and $Mg(H_2PO_4)_2$ as coprecipitants, and results in the formation of a homogeneous gel.

EXAMPLE 5

Porous ceramic macrostructures were formed by first forming slurries containing 10 to 30% by volume of MgCZP powder and deionized water. Two to ten percent by weight of a binder was then added. Preferred binders include methyl cellulose (commercially sold under the trademark Methocel) and cellulose ether. Between 1 and 5% by weight of ZnO was also added as a sintering aid. The slurry is thixotropic so it has a lower viscosity when flowing then when stationary. The slurry is applied to a flexible porous cellular plastic foam by immersing the foam into the slurry. A preferred foam is fabricated from SiF, but any other suitable foam known to those skilled in the art may be used.

Closed-cell porous ceramic macrostructures were formed by placing a slurry-saturated foam directly into a furnace and gradually heating to about 1100° C. to about 1200° C. from room temperature. A preferred heating ramp rate is about 180° C. per hour to about 250° C. per hour. Open-cell ceramic macrostructures were formed by removing excess slurry from the saturated foam by squeezing, and then sintering in the same fashion as the closed-cell ceramic macrostructures.

Porous ceramic macrostructures were also formed using ceramic powders of $NaZr_2(PO_4)_3$ and $CaZr_4(PO_4)_6$, having coefficients of thermal expansion of $-4.5 \times 10^{-6}$/°C. and $-2.7 \times 10^{-6}$/°C., respectively.

A closed-cell ceramic macrostructure made of a powder produced by the solid state reaction method that had a particle size between 20 and 50 $\mu$m was found by a scanning electron micrograph studies to have cell walls with an average thickness of 85 $\mu$m, and to have pores with diameters that are approximately 250 $\mu$m. The pores are arranged in regular arrays which interconnect to form a three-dimensional network. The surface morphology of the porous ceramic macrostructure is similar to the structure of the polymer foam which was initially coated with the ceramic slurry, and subsequently pyrolyzed.

Scanning electron micrograph studies of a porous macrostructure formed using a powder resulting from the sol-gel method that had a particle size between 20 $\mu$m and 50 $\mu$m were also made. The macrostructure had pore diameters that averaged approximately 150 $\mu$m, and the pores were arranged randomly about 230 $\mu$m apart. The unpolished specimen surface was found to be smooth. Note that, although the slurries used to make the solid state powder and sol-gel powder macrostructures had the same concentration of ceramic powder, the porous macrostructure formed from the ceramic powder produced by the sol-gel process had better sinterability and yielded a denser macrostructure with smaller pore sizes than the macrostructure formed with the solid state powder.

EXAMPLE 6

The same ceramic powders used in Example 5 were combined with fine powders of high melting point polymers. In a preferred embodiment, a poly(vinyl chloride) powder with a melting point of approximately 285° C. and/or a poly(tetrafluroethylene) powder with a melting point of 327° C. were used. However, any other suitable polymer known by one of skill in the art may also be used. Samples containing between 5 and 15% by weight of poly(vinyl chloride) or poly(tetrafluroethylene) powder, 1 to 5% by weight of a binder, and 1 to 5% by weight of ZnO were formed. Preferred binders are methyl cellulose or cellulose ether. However, any suitable binder known to one of skill in the art may also be used. The use of zinc oxide or other sintering aid is optional, although better quality macrostructures result when a sintering aid is used.

The mixtures of ceramic powder, polymeric powder, binder, and ZnO were then formed into the desired shapes, and heated in a similar fashion to the samples in Example 5. We have discovered that by adjusting the particle size of the polymeric powder used, the pore sizes of the resulting macrostructures can be altered. For example, when compositions containing 10% by weight of a polymeric powder with an average particle size of 30 $\mu$m were used, the resulting porous macrostructure has pore sizes ranging between 20 $\mu$m and 40 $\mu$m. Note that any size of polymeric powder can be used, and that the pore sizes in the resulting macrostructure will be approximately the same size as the particles in the polymeric powder.

The preceeding examples demonstrate preferred processes for producing $(Ca_xMg_{1-x})Zr_4(PO_4)_6$ were x is between 0.5 and 0.99. The MgCZP materials of the present invention can be formed by both solid state and sol-gel processes. We have overcome problems that the prior art encountered in trying to synthesize MgCZP materials by ensuring that the ratio of calcium to magnesium is greater than 1.0, and by using longer calcination times at temperatures in excess of 850° C. to produce single phase MgCZP crystals.

We have also developed an improved sol-gel process in which the pH is carefully adjusted, either before or after the addition of ammonium dihydrogen phosphate, to a pH between 6 and 10 (preferrably between 7 and 9), so that a gel of calcium, magnesium, and zirconium phosphates is formed. We have also discovered that the low-CTE MgCZP compounds of the present invention are unpredictably stable at high temperatures, and have unusually low thermal conductivities.

The low thermal conductivities, near-zero coefficients of thermal expansion, and the stability at high temperatures of the MgCZP materials of the present invention will be useful in a wide variety of high temperature applications; these uses include, but are not limited to, construction of advanced heat engines, spacecraft insulating tiles, and high precision optics.

We have also successfully demonstrated the formation of porous macrostructures of NZP and CZP ceramic materials, including the MgCZP materials of the present invention, that have low coefficients of thermal expansion, have stability at high temperatures, and, due to their high porosity, have excellent insulating qualities. These open-cell and closed-cell macrostructures can be shaped to form insulating tiles, or can be used as filters for molten metals. A variety of other uses for these materials should be immediately apparent to one of skill in the art.

We have also discovered a unique method for adjusting the pore size of porous macrosrucutres made from NZP and CZP ceramics. This is made possible by our discovery that the pore size of the resulting macrostructure will depend upon the particle size of the polymer powder blended with the appropriate ceramic powder.

From the above teachings, it is apparent that many modifications and variations of the present invention are possible. It is therefore to be understood that, within the scope of the appended claims, the invention may be practiced otherwise than as specifically described.

What is claimed is:

1. Single phase $(Ca_xMg_{1-x})Zr_4(PO_4)_6$ where x is between 0.5 and 0.99.
2. The compositions of claim 1, wherein:
   said compositions are in the form of particles less than 50 nm in size.
3. The compositions of claim 1, wherein: said compositions are in the form of particles having sizes between about 10 nm and about 50 nm.
4. The compositions of claim 1, wherein:
   x is between 0.5 and 0.8, and, for temperatures ranging from room temperature to about 1200° C., the coefficient of thermal expansion is about zero, and the thermal conductivity ranges from about 0.5 W/m°K. to about 2.0 W/m°K.

5. Macrostructures formed from the compositions of claim 1, wherein:
   said macrostructures are formed from particles of said compositions compressed and sintered together, and said compositions are stable in the single phase form at a temperature of about 1300° C. for at least 50 hours.

6. Macrostructures according to claim 5, wherein:
   x is 0.6, and said macrostructures have a density that is at least 94% of the maximum theoretical density possible for a pure solid of $(Ca_{0.6}Mg_{0.4})Zr_4(PO_4)_6$.

7. A process for producing ceramic materials comprising the steps of:
   a) combining a first solution of aqueous $Mg(NO_3)_2$, a second solution of aqueous $Ca(NO_3)_2$, and a third solution of aqueous $ZrO(NO_3)_2$ to form a fourth solution;
   b) adjusting the pH of said fourth solution with $NH_4OH$ to about pH 7 to about pH 9;
   c) adding $NH_4H_2PO_4$ to said fourth solution while stirring said fourth solution to form a precipitate;
   d) evaporating water from said fourth solution to form a gel; and
   e) calcining said gel at a temperature between 300° C. and 900° C. to form a powder having a particle size of between about 30 nm and about 50 nm, said $Ca(NO_3)_2$, $Mg(NO_3)_2$, $ZrO(NO_3)_2$ and $NH_4H_2PO_4$ being combined in steps a, b, and c in stoichiometric proportions so that said powder comprises single phase $(Ca_xMg_{1-x})Zr_4(PO_4)_6$ where x is between 0.5 and 0.99.

8. A process according to claim 7, wherein:
   said first solution has a concentration of about 1M $Mg(NO_3)_2$, said second solution has a concentration of about 1M $Ca(NO_3)_2$, and said third solution has a concentration of about 1M $ZrO(NO_3)_2$;
   step d is carried out at about 60° C. to 80° C.; and
   step e is carried out at about 300° C. to 600° C. to form said powder in an amorphous phase.

9. A process according to claim 7, wherein:
   step e is carried out at 600° C. for at least 72 hours to form said powder in a crystalline form.

10. A process according to claim 7, wherein:
    step e is carried out at 900° C. for 16 to 36 hours to form said powder in a crystalline form.

11. A process according to claim 7, further comprising the step of:
    f) sintering quantities of said powder at temperatures ranging from 1100° C. to 1400° C. form solid macrostructures.

12. A process according to claim 9, further comprising the step of:
    f) sintering quantities of said powder at temperatures ranging from 1200° C. to 1350° C. for times ranging from 24 to 72 hours to form solid macrostructures.

13. A process for producing ceramic materials, comprising the steps of:
    a) combining a first solution of aqueous $Mg(NO_3)_2$, a second solution of aqueous $Ca(NO_3)_2$, and a third solution of aqueous $ZrO(NO_3)_2$ to form a fourth solution;
    b) adding $NH_4H_2PO_4$ to said fourth solution while stirring said fourth solution to form a zirconium containing precipitate;
    c) stirring said fourth solution while adjusting the pH of said fourth solution with $NH_4OH$ to about pH 8 to pH 9 so as to coprecipitate calcium and magnesium containing compounds;
    d) evaporating water from said fourth solution to form a gel; and
    e) calcining said gel to form a powder having a particle size of between about 10 nm and about 30 nm, said $Ca(NO_3)_2$, $Mg(NO_3)_2$, $ZrO(NO_3)_2$ and $NH_4H_2PO_4$ being combined in steps a, b, and c in stoichiometric proportions so that said powder comprises single phase $(Ca_xMg_{1-x})Zr_4(PO_4)_6$ where x is between 0.5 and 0.99.

14. A process according to claim 13, wherein:
    step d is carried out at 110° C. while stirring said gel; and
    step e is carried out at temperatures ranging from about 350° C. to about 900° C., wherein said temperatures between 350° C. and about 850° C. produce an amorphous phase powder, and said temperatures above about 850° C. produce a single phase crystalline powder.

15. A process according to claim 13, wherein:
    the pH is adjusted in step c to about pH 8.5, wherein:
    when step e is carried out at 900° C. for at least about 24 hours, said powder is formed in a single phase crystalline form; and
    when step e is carried out at 600° C. for at least about 72 hours, said powder is formed in a single phase crystalline form.

16. A process according to claim 14, further comprising the step of:
    f) sintering quantities of said powder at temperatures ranging from 1100° C. to 1400° C. to form solid macrostructures.

17. A process for producing ceramic materials, comprising the steps of:
    a) combining $CaCO_3$, $MgCO_3$, $ZrO_2$, and $NH_4H_2PO_4$ in acetone to form a homogeneous mixture;
    b) heating said mixture to evaporate said acetone and form a solid;
    c) grinding said slid to a powder;
    d) mixing said powder with acetone and stirring said powder; and
    e) repeatedly heating said powder to form a solid, and grinding the solid formed to a powder, each subsequent heating step being performed at a higher temperature than the previous heating step, until a single phase solid solution is formed of $(Ca_xMg_{1-x})Zr_4(PO_4)_6$ where x is between 0.5 and 0.99, said $CaCO_3$, $MgCO_3$, $ZrO_2$, and $NH_4H_2PO_4$ having been combined in stoichiometric amounts to form said solid solution, and said temperatures of said heating steps ranging from about 150° C. to about 1300° C.

18. A process for producing ceramic materials, comprising the steps of:
    a) combining $CaZr_4(PO_4)_6$ and $MgZr_4(PO_4)_6$ in powdered form with acetone to form a homogeneous mixture;
    b) heating said mixture to evaporate said acetone; and
    c) treating said mixture at temperatures ranging from 1100° C. to 1300° C. until single phase $(Ca_xMg_{1-x})Zr_4(PO_4)_6$ where x is between 0.5 and 0.99 is formed, said $CaZr_4(PO_4)_6$ and $MgZr_4(PO_4)_6$ being combined in stoichiometric quantities to form said single phase.

19. A process for producing porous lightweight ceramic materials, comprising the steps of:
    a) combining a first solution of aqueous $Mg(NO_3)_2$, a second solution of aqueous $Ca(NO_3)_2$, and a third solution of aqueous $ZrO(NO_3)_2$ to form a fourth solution;

b) adjusting the pH of said fourth solution with $NH_4OH$ to about pH 7 to pH 9, and adding $NH_4H_2PO_4$ to said fourth solution while stirring said fourth solution to form a precipitate;

c) evaporating water from said fourth solution to form a gel;

d) calcining said gel at a temperature beneath 1400° C. to form a powder, said $Mg(NO_3)_2$, $Ca(NO_3)_2$, $ZrO(NO_3)_2$ and $NH_4H_2PO_4$ being combined in steps a and b in stoichiometric amounts so as to form said powder as single phase $(Ca_xMg_{1-x})Zr_4(PO_4)_6$ where x is between 0.5 and 0.99, said powder having a particle size of between about 20 nm and about 50 nm;

e) forming a slurry comprising said powder, water, and a binder;

f) immersing a porous polymeric foam in said slurry; and g) removing said foam coated with a quantity of said slurry from said slurry, and gradually heating said coated foam to a temperature ranging from about 1000° C. to about 1300° C. to obtain a porous macrostructure.

20. A process according to claim 19, wherein:

when said foam is saturated with said slurry, and subjected to said heating in step g), a closed-cell porous macrostructure results;

when excess slurry is removed from said foam before said heating in step g), an open-cell porous macrostructure results;

step g) is carried out by heating said coated foam from about room temperature to a temperature between about 1000° C. and about 1300° C. by increasing the temperature at a rate of about 180° C./h to about 250° C./h; and said porous macrostructures have average pore sizes ranging from about 150 μm to about 250 μm.

21. A process for producing porous ceramic materials, comprising the steps of:

a) combining a ceramic powder, polymeric powder, and a binder to form a homogeneous mixture; and b) pressing said mixture from step a) to form a macrostructure, and sintering said macrostructure at temperatures between 1200° C. and 1300° C. for 24 hours to eliminate said polymer and said binder while forming a porous macrostructure, wherein:

said ceramic powder is selected from the group consisting of $(Ca_xMg_{1-x})Zr_4(PO_4)_6$ where x is between 0.5 and 0.99, $NaZr_2(PO_4)_3$, and $NaZr_4(PO_4)_6$;

said polymer is selected from the group consisting of polyvinyl chloride, and polytetrafluoroethylene, said polymer comprising 5% to 25% by weight of said mixture;

said sintering in step b) is carried out by heating said macrostructure from about room temperature to about 1000° C. to about 1300° C. by increasing the temperature at a rate of about 180° C./h to about 250° C./h;

said mixture additionally comprises 1% to 5% by weight of ZnO as a sintering agent; and wherein:

when said polymeric powder has a particle size of 30 microns, said porous macrostructure has pores sizes ranging between 20 microns and 40 microns.

22. A process according to claim 21, further comprising the step of:

c) adjusting the pore size of the pores in said porous macrostructure by varying the particle size of said polymeric powder in step a, said pore size increasing with increasing particle size of said polymeric powder.

* * * * *